US006559775B1

(12) United States Patent
King

(10) Patent No.: US 6,559,775 B1
(45) Date of Patent: May 6, 2003

(54) PASSIVE GARAGE DOOR OPENER USING COLLISION AVOIDANCE SYSTEM

(75) Inventor: Joseph D. King, Hudson, NH (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/272,441

(22) Filed: Mar. 19, 1999

(51) Int. Cl.[7] .................................................. B60Q 1/48

(52) U.S. Cl. .............................. 340/932.2; 340/825.69; 340/825.49; 340/436; 340/10.1; 340/903; 340/5.2; 342/42; 342/44; 701/118

(58) Field of Search ........................ 340/825.69, 825.49, 340/5.2, 932.2, 10.1, 436, 903, 988, 539; 342/76, 359, 42, 44, 357.07; 701/117, 301, 118, 213, 214

(56) References Cited

U.S. PATENT DOCUMENTS 5,027,553 A 7/1991 Vergara ........................ 49/30
5,140,171 A * 8/1992 De Janasz ................ 307/10.8
5,247,440 A 9/1993 Capurka et al. .............. 701/49
5,680,134 A 10/1997 Tsui ........................... 341/173
5,689,236 A 11/1997 Kister ..................... 340/545.1

* cited by examiner

*Primary Examiner*—Daryl Pope
(74) *Attorney, Agent, or Firm*—MacMillan, Sobanski & Todd, LLC

(57) ABSTRACT

A vehicle wireless transmitter system includes a collision avoidance sensor in a wireless transmitter. The wireless transmitter generates a wireless signal, such as a garage door opener signal, based upon information from the collision avoidance sensor. The wireless transmitter generates a garage door opener signal when the collision avoidance sensor determines that the vehicle is within a predetermined distance of the garage. The wireless transmitter generates a garage door opener signal when the collision avoidance sensor determines that the vehicle is in the garage, the engine is no longer running and no motion is detected around the vehicle for a predetermined period of time.

7 Claims, 1 Drawing Sheet

PASSIVE GARAGE DOOR OPENER USING COLLISION AVOIDANCE SYSTEM

BACKGROUND OF THE INVENTION

The present invention relates to wireless transmitters for vehicles and more particularly to a passive garage door opener for vehicles which uses the vehicle's collision avoidance system.

Most new homes built are being constructed with garage door openers with remote controllers using RF wireless technology. Many existing homes are also being upgraded with garage door openers using RF wireless technology for accomplishing the remote function. The current trend in the automotive market is to provide new vehicles with factory installed universal garage door opener transmitters. Passive garage door transmitters have been proposed which do not require the user to manually actuate the transmitter.

Collision avoidance systems are beginning to gain acceptance, and consequently, being incorporated into vehicles. Several different types of collision avoidance systems have been proposed, such as blind spot detection, rear-end collision avoidance and back-up warning systems. All of these collision avoidance systems include sensors to detect the presence of objects, detect relative speed of objects and/or detect positions of objects.

SUMMARY OF THE INVENTION

The present invention provides a vehicle wireless transmitter system including a collision avoidance sensor generating a signal based upon detection of an object in an area adjacent the vehicle. A wireless transmitter generates a wireless signal based upon the signal from the collision avoidance sensor.

The system includes a passive arming system which arms the system when it determines that the vehicle is within a predetermined distance from the associated receiver. When the system is armed, the collision avoidance sensor monitors the proximity of the vehicle to a garage door. When the vehicle is within a predetermined distance of the garage door as determined by the collision avoidance sensor, the wireless transmitter sends the wireless signal to open the garage door.

The collision avoidance sensors monitor the movement of the vehicle into the garage and determine when the vehicle is in the garage. When the vehicle is in the garage and the engine is not running, the collision avoidance sensors monitor movement around the vehicle. When there is no movement around the vehicle for a predetermined period of time, the wireless transmitter generates a wireless signal closing the garage door.

BRIEF DESCRIPTION OF THE DRAWINGS

The above, as well as other advantages of the present invention, will become readily apparent to those skilled in the art from the following detailed description of a preferred embodiment when considered in the light of the accompanying drawing in which.

DETAILED DESCRIPTION OF THE PREFERRED EMBODIMENT

Figure 1:
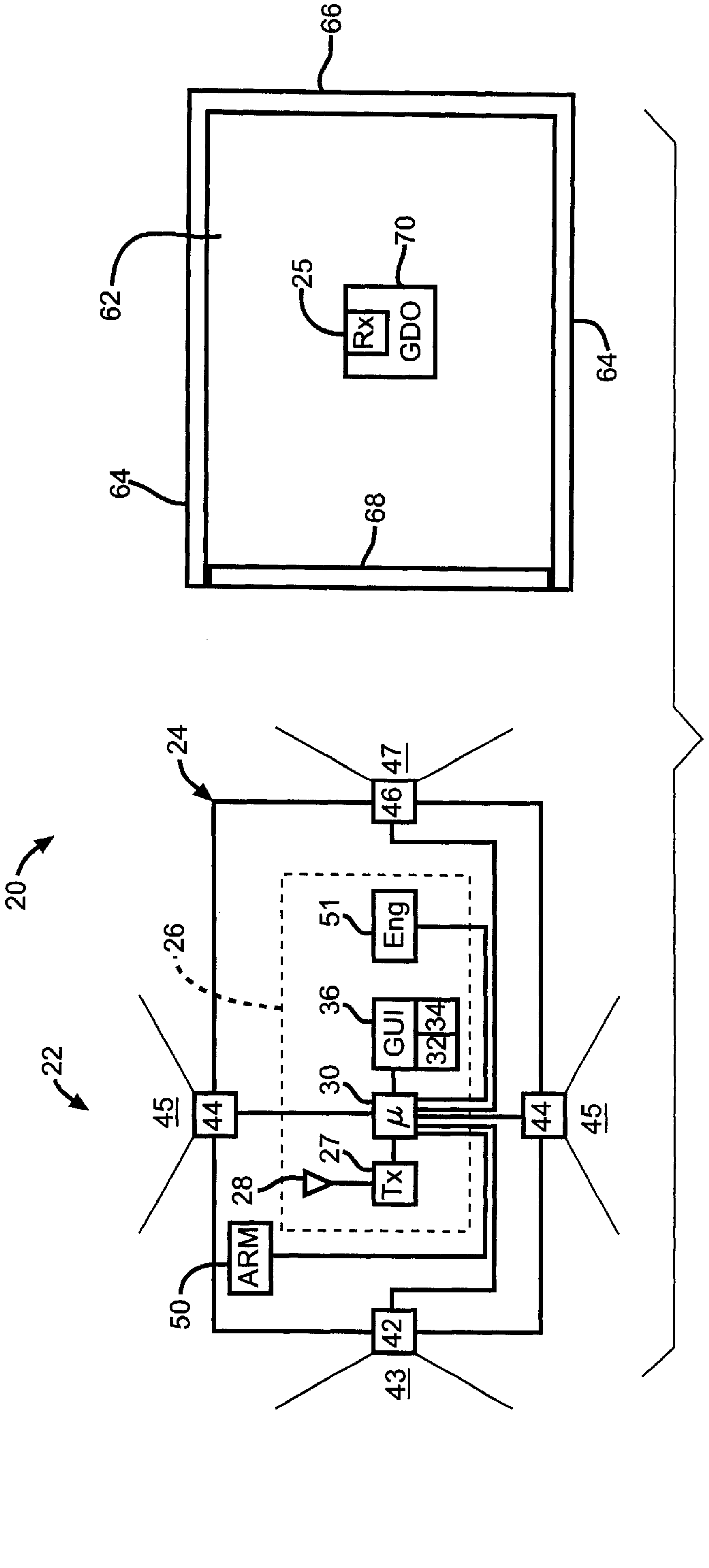
FIG. 1 is a schematic of a passive garage door opener system of the present invention.

The present invention provides a vehicle wireless communication system 20 generally comprising a transmitter system 22 mounted on a vehicle 24 and a complementary receiver 25. The transmitter system 22 includes a garage door opener 26 including a wireless transmitter 27 selectively transmitting a wireless signal via an antenna 28. The transmitter 27 could be RF, infrared, microwave, etc. The transmitter 27 transmits a code which is generated by a processor 30. The transmitted code may be encrypted, rolled, or constant. Encryption and rolling code techniques are well known in the art.

A user interface 32, including an input device 34 and a display 36 is connected to the processor 30. The processor 30 causes the transmitter 27 to generate a garage door opener signal based upon input from input device 34. The processor 30 also causes the transmitter 27 to generate the garage door opener signal based upon input from the vehicle's collision avoidance system 40, as will be described below.

Collision avoidance systems are well known in the art. The collision avoidance system 40 includes a back-up sensor 42 monitoring an area 43 generally adjacent the rear of the vehicle. The collision avoidance system 40 further includes a pair of blind spot detectors 44 each monitoring an area 45 adjacent the lateral sides of the vehicle 24. The collision avoidance system 40 further includes a forward looking sensor 46 monitoring an area 47 adjacent the front of the vehicle 24. As is well known, the collision avoidance sensors 42, 44 and 46 could comprise doppler, range sensors, motion detectors, infrared sensors, lasers, radar, etc. Depending upon the type of sensor, the sensors 42, 44 and 46 may sense the presence of objects, motion by objects and/or distance of objects in the associated areas 43, 45 and 47, respectively. The sensors 42, 44 and 46 may send a wireless signal into their respective areas 43, 45 47 and determine the presence, distance and/or motion of an object based upon a reflection of the signal.

Preferably, each of the sensors 42, 44 and 46 determine distance to objects in their respective areas 43, 45 and 47, respectively, and detect motion in those areas. This information is sent to the processor 30 which processes the information from the sensors 42, 44 and 46 and generates appropriate information to the user via the display 36. For example, the processor 30, based upon information from the sensors 42, 44 and 46 displays information regarding the presence, location and motion of objects in the monitored areas 43, 45 and 47 on the display 36. The processor 30 also generates audible warnings via the user interface 32. The operation of collision avoidance systems 40 and variations to this collision avoidance system 40 are well known in the art. Alternatively, the collision avoidance system 40 could utilize its own processor to process data from the sensors 42, 44 and 46 and to generate its own warnings and information to the user.

The transmitter system 22 further includes an arming system 50 which arms the garage door opener 26 when the vehicle 24 (and transmitter system 22) is in the vicinity of the receiver 25. The arming system 50 may comprise a global positioning system or navigation system which generates an arming signal to the processor 30 when it determines that the vehicle 24 is geographically in the vicinity of a known geographic location of the receiver 25. Details of such an arming system 50 are disclosed in co-pending application U.S. Ser. No. 09/088,933, entitled Passive Garage Door Opener, the assignee of which is the assignee of the present invention and which is hereby incorporated by reference.

An alternate arming system 50 could comprise permanent magnets installed near the end of a driveway leading to the receiver 25 and one or more magnet sensors affixed to the vehicle 24. In that embodiment, the arming system 50 determines that the vehicle 24 is in the vicinity of the receiver 25 when the magnetic sensors detect the presence of the magnets which are permanently installed in the vicinity of the receiver 25. Details of such a system are disclosed in co-pending application U.S. Serial No. 09/098,441, entitled Passive Garage Door Opener System, which is hereby incorporated by reference. Other implementations of the arming system 50 could also be utilized.

The processor 30 further receives an input from the vehicle engine 51. The input from the vehicle engine 51 indicates to the processor 30 whether the engine 51 is running.

The receiver 25 is installed at the user's garage 62. The garage 62 includes two generally parallel sidewalls 64, a rear wall 66 and a garage door 68 at a forward end, all of which enclose the garage 62. The receiver 25 is connected to a garage door opener motor 70 which, based upon activation by the receiver 25, selectively opens or closes the garage door 68. Preferably, the garage door opener receiver 25 includes a sensor for indicating whether the garage door 68 is already in the open or closed position. Further, the transmitting system 22 preferably generates different signals for opening and closing the garage door.

The operation of the communication system 20 as described herein is controlled by the processor 30 which is programmed with appropriate software. Creation of the appropriate software to perform the functions described herein is well within the skill of the art. Generally, wireless signals are transmitted by transmitter 27 based upon information from the collision avoidance sensors 42, 44 and 46. Again, although the collision avoidance sensors 42, 44 and 46 preferably provide information indicating the presence, distance and motion of objects, alternate systems could utilize presence, distance or motion information.

When the vehicle 24 approaches the garage 62, the arming system 50 determines that the vehicle 24 is in the vicinity of the garage 62 (such as by GPS, as described above). The arming system 50 so indicates to the processor 30, which is then "armed." When armed, processor 30 monitors the sensors 42, 44 and 46 before activation of the transmitter 27. When the forward sensor 46 determines that an object is in the area 47 adjacent the front of the vehicle, the processor 30 determines that that object is the garage door 68 and causes the transmitter 27 to generate a garage door opener "open" signal via antenna 28 to the garage door opener receiver 25. Upon receiving the "open" signal, the receiver 25 causes the garage door opener motor 70 to open the garage door 68.

After the garage door 68 is opened, the vehicle 24 is driven into the garage 62, between sidewalls 64 and approaches the rear wall 66 of the garage 62. The collision avoidance sensors 42, 44 and 46 monitor the progress of the vehicle 24 into the garage 62 by monitoring the position of the sidewalls 64 and rear wall 66 relative to the vehicle 24. The processor 30 determines when the vehicle 24 is fully in the garage 62 by monitoring the sensors 42, 44 and 46. When the vehicle 24 is fully in the garage 62, the driver switches off the engine 51 of the vehicle 24, sending an "engine off" signal to the processor 30. When the vehicle 24 is fully in the garage 62 and the engine 51 is off, the processor 30 monitors sensors 42, 44 and 46 for motion around the vehicle 24. When no motion is detected for a predetermined period of time after the engine 51 is off and the vehicle 24 is in the garage 62, the processor 30 causes the transmitter 27 to transmit a garage door "close" signal to the receiver 25. In response, the receiver 25 causes the garage door opener motor 70 to close the garage door 68.

Subsequently, when the engine 51 is restarted, the back up sensor 42 determines whether the garage door 68 is closed; if so, the transmitter 27 generates a garage door "open" signal. The processor 30 then monitors the sensors 42, 44 and 46 to determine the position of the vehicle 24 as it is backed out of the garage 62. When the processor 30 determines that the vehicle 24 is fully out of the garage 62, the transmitter 27 generates a garage door "close" signal.

The vehicle wireless communication system 20 of the present invention provides a passive garage door opener system which automatically opens and closes the garage door without requiring input from the user. The system shares sensors from the vehicle's collision avoidance system, thereby reducing cost.

The present invention has been described with respect to garage door openers for illustration. The present invention could also be incorporated into systems such as estate gates and home security systems.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A vehicle wireless transmitter system comprising:

a sensor mounted in the vehicle, said sensor being for generating information in response to detection of an object adjacent the vehicle; and a wireless transmitter mounted in the vehicle for automatically generating a wireless signal based upon the information in response to said sensor generating the information, where the receiver is complementary to said transmitter and the wireless signal is for receipt by the receiver for actuating a remote control system for controlling movement of the vehicle; and an arming system for determining whether or not the vehicle is in a defined vicinity of a receiver, said arming system arming said transmitter system to permit transmission of the wireless signal only in response to a determination that the vehicle is in the defined vicinity.

2. The transmitter system of claim 1, wherein said arming system determines the geographical location of the vehicle.

3. The transmitter system of claim 1, wherein said arming system arms said transmitter to transmit the wireless signal.

4. The transmitter system of claim 1, wherein said arming system arms said sensor to generate the information.

5. The transmitter system of claim 1, further comprising the remote control system, said remote control system including the receiver and a garage door opener activated in response to said receiver receiving the wireless signal for actuating a garage door to move so as to control movement of the vehicle.

6. The transmitter system of claim 5, wherein said garage door opener opens the garage door in response to said receiver receiving the wireless signal.

7. The transmitter system of claim 5, wherein said garage door opener closes the garage door in response to said receiver receiving the wireless signal.

* * * * *